(12) United States Patent  
Hayasaka et al.

(10) Patent No.: US 11,807,210 B2  
(45) Date of Patent: Nov. 7, 2023

(54) VEHICLE CONTROL DEVICE

(71) Applicant: TOYOTA JIDOSHA KABUSHIKI KAISHA, Toyota (JP)

(72) Inventors: Akihito Hayasaka, Nisshin (JP); Masato Yoshikawa, Toyota (JP); Nobufusa Kobayashi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 260 days.

(21) Appl. No.: 17/394,727

(22) Filed: Aug. 5, 2021

(65) Prior Publication Data

US 2022/0118968 A1 Apr. 21, 2022

(30) Foreign Application Priority Data

Oct. 21, 2020 (JP) ................... 2020-176976

(51) Int. Cl.
- *B60W 30/20* (2006.01)
- *B60W 20/40* (2016.01)
- *B60W 10/08* (2006.01)
- *B60W 10/06* (2006.01)
- *B60W 20/30* (2016.01)

(Continued)

(52) U.S. Cl.  
CPC ............ *B60W 20/40* (2013.01); *B60K 6/36* (2013.01); *B60K 6/48* (2013.01); *B60W 10/06* (2013.01); *B60W 10/08* (2013.01); *B60W 10/11* (2013.01); *B60W 20/30* (2013.01); *B60K 6/547* (2013.01);

(Continued)

(58) Field of Classification Search  
CPC ........ Y02T 10/62; Y02T 10/40; B60W 10/06; B60W 10/11; B60W 10/111; B60W 10/113; B60W 2050/0095; B60W 50/06; B60W 2520/403; B60W 2520/40; B60W 2520/00; B60W 20/40; B60W 20/10; B60W 20/14; B60W 20/17; B60W 2710/025; B60W 2710/028; B60W 2710/082;

(Continued)

(56) References Cited

U.S. PATENT DOCUMENTS

2018/0056969 A1\* 3/2018 Tsuda .................. B60W 10/10  
2018/0237023 A1\* 8/2018 Orita .................... B60W 30/20

FOREIGN PATENT DOCUMENTS

CN 111071239 A \* 4/2020 ............ B60W 10/02  
CN 111169457 A \* 5/2020 ............ B60W 10/02

(Continued)

*Primary Examiner* — George C Jin  
*Assistant Examiner* — Teuta B Holbrook  
(74) *Attorney, Agent, or Firm* — Oliff PLC (57) ABSTRACT

In a driven state phase, target input torque is limited to a first limit value, whereas in a backlash-elimination state phase, the target input torque is limited to a second limit value and target engine torque and torque of a motor-generator are controlled according to the target input torque. In the backlash-elimination state phase, the target input torque is limited to the second limit value that is suitable for mitigating rattling shock, so that rattling shock can be appropriately mitigated. Meanwhile, in the driven state phase, the target input torque is limited to the relatively high first limit value, so that an MG rotation speed can be quickly increased to eliminate a rotational difference, which enhances the responsiveness of driving power up to when required driving power is obtained after elimination of the backlash.

8 Claims, 4 Drawing Sheets

(51) Int. Cl.
*B60K 6/48* (2007.10)
*B60W 10/11* (2012.01)
*B60K 6/36* (2007.10)
*B60K 6/547* (2007.10)

(52) U.S. Cl.
CPC .......... *B60W 2710/025* (2013.01); *B60W 2710/0666* (2013.01); *B60W 2710/083* (2013.01)

(58) Field of Classification Search
CPC ..... B60W 2710/081; B60W 2710/083; B60W 2710/085; B60K 6/46; B60K 6/36
See application file for complete search history.

(56) References Cited

FOREIGN PATENT DOCUMENTS

| CN | 111731111 A | * | 10/2020 | .............. B60L 15/20 |
|----|----|----|----|----|
| DE | 102005033354 A1 | * | 3/2006 | ............... B60K 6/20 |
| JP | 2000052794 A | * | 2/2000 | ............ B60K 6/543 |
| JP | 2004278340 A | * | 10/2004 | |
| JP | 2012-091581 A | | 5/2012 | |
| JP | 2012091618 A | * | 5/2012 | |
| JP | 5360032 B2 | * | 12/2013 | |

* cited by examiner

VEHICLE CONTROL DEVICE

CROSS-REFERENCE TO RELATED APPLICATION

This application claims priority to Japanese Patent Application No. 2020-176976 filed on Oct. 21, 2020, incorporated herein by reference in its entirety.

BACKGROUND

1. Technical Field

The disclosure relates to a vehicle control device, and particularly to backlash elimination control of eliminating backlash in a gear mechanism when a vehicle transitions from driven travel to driving travel.

2. Description of Related Art

There has been a proposed technique that is applied to a vehicle having a gear mechanism installed on a power transmission path between a driving power source and driving wheels, and that, when the vehicle transitions from driven travel to driving travel while decelerating, eliminates backlash in the gear mechanism by limiting creep torque to thereby mitigate rattling shock (gear hammering noise, torque fluctuations, etc.) that the gear mechanism experiences due to the backlash (see Japanese Unexamined Patent Application Publication No. 2012-91581 (JP 2012-91581 A)).

SUMMARY

Rattling shock can occur also in a vehicle having a fluid transmission device and a gear mechanism installed in series on a power transmission path between a driving power source and driving wheels when the vehicle transitions from driven travel to driving travel. Since power is transmitted through a fluid, the problem is how to control the input torque so as to secure the responsiveness up to when the vehicle transitions to driving travel and at the same time mitigate the rattling shock.

The disclosure has been contrived under these circumstances, and an object thereof is to make it possible, when power transmission is performed through a fluid, to transition from driven travel to driving travel as quickly as possible while mitigating rattling shock at the time of transition to driving travel.

To achieve this object, a first aspect is (a) a vehicle control device for a vehicle equipped with an electric motor as a driving power source and having a fluid transmission device and a gear mechanism installed on a power transmission path between the driving power source and driving wheels, in series from the side of the driving power source. (b) The vehicle control device has a backlash-elimination control unit that eliminates backlash in the gear mechanism when the vehicle transitions from driven travel in which power is transmitted from the side of the gear mechanism toward the side of the driving power source through the fluid transmission device to driving travel in which power is transmitted from the side of the driving power source toward the side of the gear mechanism through the fluid transmission device. (c) The backlash-elimination control unit has: (c-1) a first input limiting part that, in a predetermined driven state phase in which a rotational difference obtained by subtracting an output rotation speed of the fluid transmission device on the side of the gear mechanism from an input rotation speed of the fluid transmission device on the side of the driving power source is negative, limits input torque that is input into the fluid transmission device from the side of the driving power source to a first limit value by controlling torque of the electric motor; and (c-2) a second input limiting part that, in a predetermined backlash-elimination state phase that follows the driven state phase and is set in a region near a point at which the rotational difference changes from negative to positive, limits the input torque to a second limit value lower than the first limit value by controlling the torque of the electric motor.

A second aspect is the vehicle control device of the first aspect, wherein the second input limiting part limits an initial value of the input torque in the backlash-elimination state phase to the second limit value and then gradually increases the input torque above the second limit value.

A third aspect is the vehicle control device of the first aspect or the second aspect, wherein the first limit value is set according to the rotational difference so as to become higher when the absolute value of the rotational difference is large than when the absolute value is small.

A fourth aspect is the vehicle control device of the third aspect, wherein: (a) the first limit value is set so as to become gradually lower as the absolute value of the rotational difference becomes smaller; and (b) when limiting the input torque in the driven state phase, the first input limiting part changes the input torque according to changes in the first limit value that changes as the absolute value of the rotational difference changes.

A fifth aspect is the vehicle control device of any one of the first aspect to the fourth aspect, wherein: (a) the electric motor is a motor-generator capable of functioning as a generator under regeneration control, and the vehicle includes an engine other than the motor-generator as a driving power source; (b) the first input limiting part makes the input torque meet the first limit value by operating the engine at target engine torque that is lower than the first limit value and higher than the second limit value and compensating for a shortage relative to the first limit value using the motor-generator; and (c) the second input limiting part makes the input torque meet the second limit value by operating the engine at target engine torque that is higher than the second limit value and offsetting an excess relative to the second limit value by regeneration control of the motor-generator.

A sixth aspect is the vehicle control device of the fifth aspect, wherein the second input limiting part gradually increases each of the target engine torque and the input torque in the backlash-elimination state phase, and in that process raises the target engine torque until meeting required input torque, while controlling the engine and the motor-generator such that a gradually increasing state of the input torque is maintained regardless of the target engine torque being raised.

A seventh aspect is the vehicle control device of the fifth aspect or the sixth aspect, wherein the backlash-elimination control unit includes a backlash-elimination ending processing part that, when it is determined that elimination of backlash in the gear mechanism has been completed in the backlash-elimination state phase in which the input torque is limited by the second input limiting part, gradually increases the input torque at a predetermined change rate until meeting required input torque by torque control of the motor-generator.

An eighth aspect is the vehicle control device of any one of the first aspect to the seventh aspect, wherein the backlash-elimination control unit eliminates backlash in the gear mechanism when the vehicle in the driven travel transitions to the driving travel in response to an acceleration request.

In the driven state phase in which the rotational difference is negative, this vehicle control device limits the input torque to the first limit value by the first input limiting part, whereas in the backlash-elimination state phase near the point at which the rotational difference changes from negative to positive, the vehicle control device limits the input torque to the second limit value lower than the first limit value by the second input limiting part. Thus, in the backlash-elimination state phase, the input torque is limited to the sufficiently low second limit value that is suitable for mitigating rattling shock, so that rattling shock can be appropriately mitigated. Meanwhile, in the driven state phase, the input torque is limited to the relatively high first limit value, so that the input rotation speed can be quickly increased to eliminate the rotational difference. As a result, it takes a shorter time to transition to driving travel after the backlash-elimination state phase, and predetermined responsiveness of driving power can be achieved. In particular, these modes of input torque control are performed using the electric motor, which makes it possible to control the input torque with high accuracy and to mitigate the rattling shock while securing the responsiveness of driving power.

In the second aspect, the initial value of the input torque in the backlash-elimination state phase is limited to the second limit value and then the input torque is gradually increased. Thus, the backlash in the gear mechanism can be eliminated using minimum input torque required to eliminate the backlash, and moreover, the backlash in the gear mechanism is reliably eliminated in the process of gradually increasing the input torque, regardless of individual differences among parts, including rotational resistance.

In the third aspect, the first limit value becomes higher when the absolute value of the rotational difference is large than when the absolute value is small, which makes it possible to mitigate the rattling shock while securing the responsiveness of driving power. That is, when the absolute value of the rotational difference is large and the input torque (first limit value) is low, it takes a long time to eliminate the rotational difference due to the low speed with which the input rotation speed increases, so that the responsiveness of driving power is reduced. Conversely, when the absolute value of the rotational difference is small and the input torque (first limit value) is high, the speed with which the input rotation speed increases may become so high that significant rattling shock occurs in the next backlash-elimination state phase.

In the fourth aspect, the first limit value is set so as to become gradually lower as the absolute value of the rotational difference becomes smaller, and when limiting the input torque in the driven state phase, the first input limiting part changes the input torque according to changes in the first limit value that changes as the absolute value of the rotational difference changes. Thus, the input torque is appropriately controlled according to changes in the rotational difference, so that the rattling shock can be mitigated while the responsiveness of driving power is secured.

In the fifth aspect, in the case where a motor-generator is used as the electric motor and the vehicle includes an engine other than the motor-generator as a driving power source, the first input limiting part makes the input torque meet the first limit value by operating the engine at target engine torque that is lower than the first limit value and higher than the second limit value and compensating for a shortage relative to the first limit value using the motor-generator. The second input limiting part makes the input torque meet the second limit value by operating the engine at target engine torque that is higher than the second limit value and offsetting an excess relative to the second limit value by regeneration control of the motor-generator. Thus, also when the torque capacity of the motor-generator is relatively small, the input torque can be controlled with high accuracy by torque control of the motor-generator. That is, not only when the torque capacity of the motor-generator itself is small, but also when the torque of the motor-generator is limited due to factors including limitations on the input and output (limitations on charge and discharge) of an electricity storage device, such as a battery, the input torque can be controlled with high accuracy using the motor-generator.

In the sixth aspect, the target engine torque and the input torque are each gradually increased in the backlash-elimination state phase, and in that process the target engine torque is raised until meeting the required input torque, while the engine and the motor-generator are controlled such that the gradually increasing state of the input torque is maintained regardless of the target engine torque being raised. Thus, as in the second aspect, the backlash in the gear mechanism can be smoothly eliminated using minimum input torque required to eliminate the backlash, and moreover, the backlash in the gear mechanism is reliably eliminated in the process of gradually increasing the input torque, regardless of individual differences among parts, including rotational resistance. Further, since the target engine torque is raised until meeting the required input torque in the process of gradually increasing the input torque, the required input torque can be quickly generated based on the engine torque after completion of elimination of the backlash, which enhances the responsiveness of driving power.

In the seventh aspect, when it is determined that elimination of the backlash in the gear mechanism has been completed in the backlash-elimination state phase, the input torque is gradually increased at a predetermined change rate until meeting the required input torque by torque control of the motor-generator. Thus, the input torque is smoothly increased according to the change rate after completion of elimination of the backlash, which makes it less likely that driving power may change rapidly due to a rapid change in the input torque and cause discomfort to the driver.

The responsiveness of driving power is required in the case where the backlash in the gear mechanism is eliminated by the backlash-elimination control unit when the vehicle in the driven travel transitions to the driving travel in response to an acceleration request. Therefore, the eighth aspect can remarkably exhibit the advantage of the aspect of being able to mitigate the rattling shock while securing the responsiveness of driving power.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The disclosure is suitably applied to an electric vehicle that includes only an electric motor as a driving power source, or a hybrid electric vehicle that includes an engine (internal combustion engine) other than an electric motor as a driving power source. A motor-generator that can be used also as a generator is suitable as the electric motor, but the electric motor may also be one that cannot be used as a generator. A torque converter having a torque amplifying effect is suitably used as a fluid transmission device, but a fluid coupling or the like may also be used. As a gear mechanism, various types of power transmission mechanisms having meshing gears are usable, examples of which include gear-driven stepped transmissions of planetary-gear type, constant-mesh type, etc., gear-driven transmissions that transmit power at fixed gear ratios, gear-driven steering reversers of planetary-gear type etc., and differential gears that distribute power to left and right driving wheels.

Backlash elimination control by a backlash-elimination control unit is suitably used when, for example, the vehicle in driven travel transitions to driving travel in response to an acceleration request. Not only that, this control can be used in various situations where the vehicle transitions from driven travel to driving travel, such as when the vehicle, while decelerating, transitions from driven travel using engine braking or regenerative braking to driving travel using creep torque. Driven travel is, for example, coasting or decelerated travel in which the accelerator operation amount is zero etc. and the required amount of acceleration is zero, but may also be driven travel during downhill travel in which acceleration is on with the accelerator pedal operated by being pressed. The backlash elimination control of the disclosure can be performed also when the vehicle transitions to driving travel as a result of the accelerator pedal being pressed further as an acceleration request. An acceleration request is made, for example, when the driver performs an acceleration requesting operation, such as an operation of pressing the accelerator pedal, but an acceleration request may also be made during automatic driving in which the driver does not operate the accelerator.

The second input limiting part is configured to, for example, limit an initial value of input torque in a backlash-elimination state phase to a second limit value and then gradually increase the input torque. However, it is also possible to eliminate the backlash in the gear mechanism while maintaining the input torque at a fixed second limit value. Various aspects are possible; for example, the input torque may be gradually increased as necessary by observing changes in the rotational difference, or the change rate in thus gradually increasing the input torque may be varied. The second limit value may be set to a fixed value in advance, or may be set so as to vary based on the change rate of the rotational difference at the start of the backlash-elimination state phase etc. The starting point of the back-lash-elimination state phase is suitably set based on the magnitude of the rotational difference. For example, the rotational difference immediately before it changes from a negative value to zero is set as a backlash-elimination criterial value used for determining whether the vehicle is in the backlash-elimination state phase. The backlash-elimination criterial value may be a fixed value, or may be set so as to vary according to the change rate of the rotational difference etc. The backlash-elimination state phase is set, for example, so as to include a point at which the rotational difference changing from negative to positive becomes zero. However, as rattling shock occurs more often after the rotational difference has changed from negative to positive, the backlash-elimination state phase may be set in a region where the rotational difference is positive after changing from negative to positive. The starting point of the backlash-elimination state phase means an ending point of a driven state phase in which the input torque is controlled by a first input limiting part. The starting point of the driven state phase can also be set based on the magnitude of the rotational difference.

A first limit value to which the input torque is limited in the driven state phase may be set to a fixed value in advance, but it is desirable that the first limit value be set such that it varies according to the rotational difference so as to become higher when the absolute value of the rotational difference is large than when the absolute value is small. The first input limiting part may simply maintain the input torque at fixed input torque according to the first limit value at the start of limiting the input torque, but may also vary the input torque according to, for example, changes in the rotational difference.

When the vehicle includes an engine and a motor-generator as driving power sources, it is desirable that the engine be operated at target engine torque that is lower than the first limit value and higher than the second limit value, and that an excess or a shortage relative to the first limit value or the second limit value be adjusted using torque of the motor-generator. However, it is also possible to perform the backlash elimination control, for example, by torque control of the motor-generator alone while stopping the engine or maintaining it in an idling state. When the vehicle includes an engine and a motor-generator as driving power sources, it is desirable that the target engine torque and the input torque be each gradually increased in the backlash-elimination state phase. However, the target engine torque and the input torque may be each maintained at a fixed value, or only the input torque may be gradually increased by torque control of the motor-generator. Various aspects are possible; for example, the target engine torque and the input torque may be gradually increased as necessary by observing changes in the rotational difference, or the change rate in thus gradually increasing the torques may be varied.

When the vehicle includes an engine and a motor-generator as driving power sources, it is desirable that the target engine torque be raised until meeting required input torque in the process of the backlash elimination control. However, the target engine torque may be raised to the required input torque after completion of elimination of the backlash. It is desirable that after completion of elimination of the backlash, for example, a backlash-elimination ending process of smoothly increasing the input torque at a predetermined change rate by torque control of the motor-generator be performed. However, the input torque may be quickly increased by raising the engine torque etc.

In the following, an embodiment of the disclosure will be described in detail with reference to the drawings. In the following embodiment, the drawings are simplified or modified as necessary for description, and the dimensional ratios, shapes, etc. of parts are not necessarily exactly represented.

Figure 1:
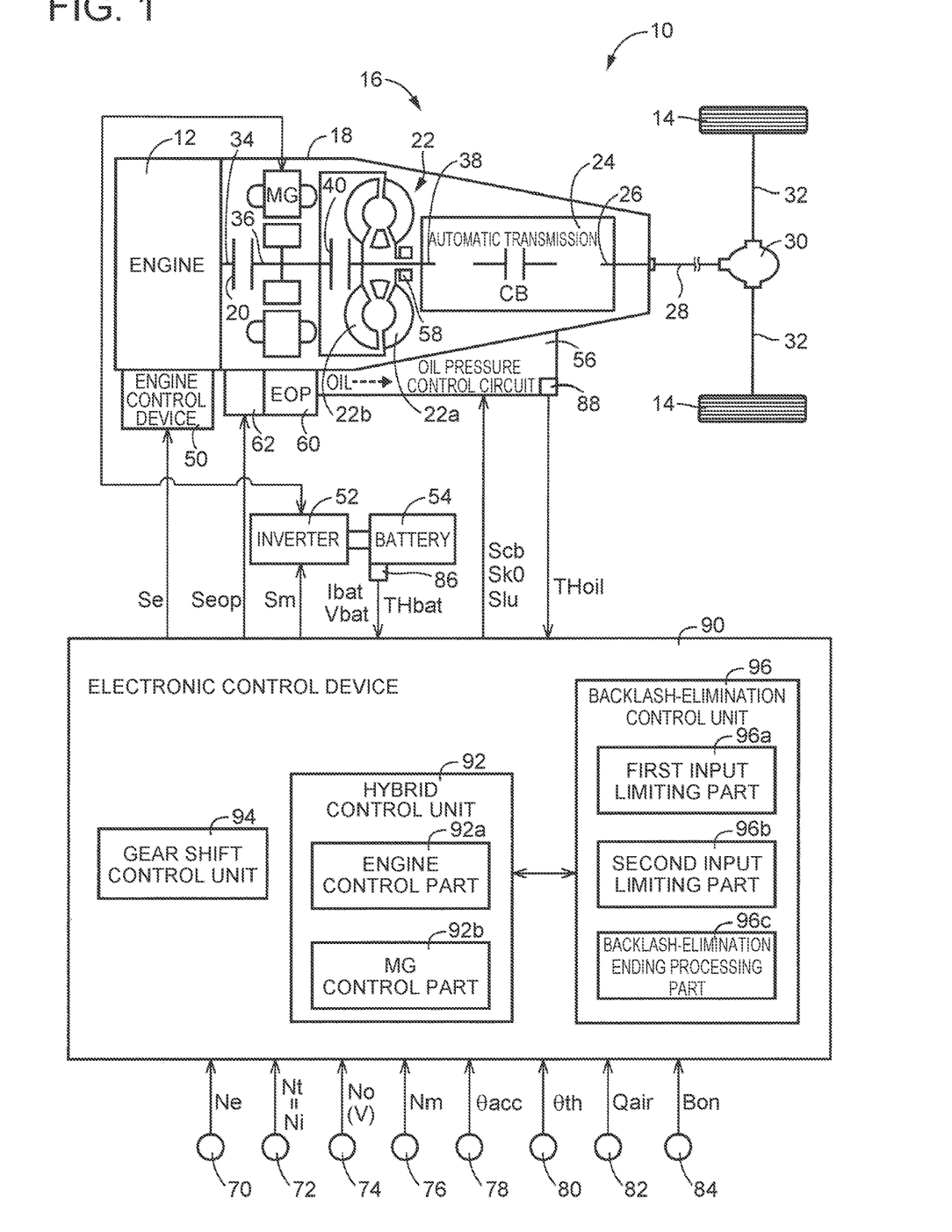
FIG. 1 is a schematic configuration diagram illustrating a driving system of a vehicle having a control device that is one embodiment of the disclosure, along with a main part of control functions and a control system for various modes of control.

FIG. 1 is a schematic configuration diagram of a driving system of a vehicle 10 having a control device that is one embodiment of the disclosure, along with a main part of control functions and a control system for various modes of control in the vehicle 10. In FIG. 1, the vehicle 10 is a hybrid electric vehicle including an engine 12 and a motor-generator MG as driving power sources for traveling. The vehicle 10 further includes a power transmission device 16 that is provided on a power transmission path between the engine 12 and driving wheels 14.

The engine 12 is a commonly known internal combustion engine, such as a gasoline engine or a diesel engine. The engine 12 has engine torque Te that is output torque thereof controlled as an engine control device 50 that is provided in the vehicle 10 and includes a throttle actuator, fuel injection equipment, and an ignition system is controlled by an electronic control device 90 to be described later.

The motor-generator MG is a rotating electric machine that functions as an electric motor to generate mechanical power from electricity as well as functions as a generator to generate electricity from mechanical power. The motor-generator MG is connected to a battery 54 provided in the vehicle 10 through an inverter 52 provided in the vehicle 10. The motor-generator MG has MG torque Tm that is output torque thereof controlled as the inverter 52 is controlled by the electronic control device 90 to be described later. For example, when the rotation direction of the motor-generator MG is a normal rotation direction that is the same rotation direction as during operation of the engine 12, the MG torque Tm is controlled such that positive torque on the acceleration side is motoring torque and negative torque on the deceleration side is regenerative torque. Specifically, in place of or in addition to the engine 12, the motor-generator MG generates power for traveling from electricity supplied thereto from the battery 54 through the inverter 52. Further, the motor-generator MG generates electricity by being driven to rotate by power from the engine 12 or driven power input from the side of the driving wheels 14. Electricity resulting from power generation by the motor-generator MG is stored in the battery 54 through the inverter 52. The battery 54 is an electricity storage device that provides and receives electricity to and from the motor-generator MG. "Electricity" is synonymous with "electric energy" when no particular distinction is made therebetween. "Power" is synonymous with "torque" or "force" when no particular distinction is made therebetween.

The power transmission device 16 includes, inside a case 18 that is a non-rotating member mounted on a vehicle body, a K0 clutch 20, a torque converter 22, and an automatic transmission 24 in series from the side of the engine 12, with the motor-generator MG coupled to a power transmission path between the K0 clutch 20 and the torque converter 22. The K0 clutch 20 is a clutch that is provided between the engine 12 and the motor-generator MG on the power transmission path between the engine 12 and the driving wheels 14, and is an engine connecting-disconnecting device that connects and disconnects the motor-generator MG and the engine 12 to and from each other. The torque converter 22 is a fluid transmission device that is provided between the motor-generator MG and the automatic transmission 24 and coupled to the engine 12 through the K0 clutch 20. The automatic transmission 24 is coupled to the torque converter 22 and interposed on the power transmission path between the torque converter 22 and the driving wheels 14. The torque converter 22 and the automatic transmission 24 each constitute part of the power transmission path between the engine 12 and the driving wheels 14. The power transmission device 16 includes: a propeller shaft 28 coupled to a transmission output shaft 26 that is an output rotating member of the automatic transmission 24; a differential gear 30 coupled to the propeller shaft 28; and a pair of driveshafts 32 coupled to the differential gear 30. The power transmission device 16 further includes an engine coupling shaft 34 that couples the engine 12 and the K0 clutch 20 together, and an MG coupling shaft 36 that couples the K0 clutch 20 and the torque converter 22 together. The automatic transmission 24 and the differential gear 30 correspond to the gear mechanism that experiences rattling shock, such as gear hammering noise and torque fluctuations, due to backlash when the vehicle transitions from driven travel to driving travel.

The motor-generator MG is coupled to the MG coupling shaft 36 inside the case 18 so as to be able to transmit power. The motor-generator MG is coupled to the power transmission path between the engine 12 and the driving wheels 14, particularly to the power transmission path between the K0 clutch 20 and the torque converter 22, so as to be able to transmit power. Thus, the motor-generator MG is coupled to the torque converter 22 and the automatic transmission 24 so as to be able to transmit power, without the K0 clutch 20 interposed therebetween. From another perspective, the torque converter 22 and the automatic transmission 24 each constitute part of the power transmission path between the motor-generator MG and the driving wheels 14. The torque converter 22 and the automatic transmission 24 each transmit driving power from each of the driving power sources, namely, the engine 12 and the motor-generator MG, to the driving wheels 14.

The torque converter 22 includes a pump impeller 22a coupled to the MG coupling shaft 36, and a turbine impeller 22b coupled to a transmission input shaft 38 that is an input rotating member of the automatic transmission 24. The pump impeller 22a is coupled to the engine 12 through the K0 clutch 20 and directly coupled to the motor-generator MG. The pump impeller 22a is an input member of the torque converter 22, and the turbine impeller 22b is an output member of the torque converter 22. The MG coupling shaft 36 is also an input rotating member of the torque converter 22. The transmission input shaft 38 is also an output rotating member of the torque converter 22 that is formed integrally with a turbine shaft that is driven to rotate by the turbine impeller 22b. The torque converter 22 is a fluid transmission device that transmits driving power from each of the driving power sources (the engine 12 and the motor-generator MG) to the transmission input shaft 38 through a fluid. The torque converter 22 includes an LU clutch 40 that couples the pump impeller 22a and the turbine impeller 22b together. The LU clutch 40 is a direct-coupling clutch, i.e., a commonly known lock-up clutch, that couples the input rotating member and the output rotating member of the torque converter 22 together.

The operating state, i.e., the control state, of the LU clutch 40 is switched as LU clutch torque Tlu that is the torque capacity of the LU clutch 40 is changed by an LU oil pressure PRlu that is regulated and supplied from an oil pressure control circuit 56 provided in the vehicle 10. The control state of the LU clutch 40 includes a fully released state in which the LU clutch 40 is released, a slip state in which the LU clutch 40 is engaged with slippage, and a fully engaged state in which the LU clutch 40 is engaged. As the LU clutch 40 is switched to the fully released state, the torque converter 22 is switched to a torque converter state in which a torque amplifying effect can be produced. As the LU clutch 40 is switched to the fully engaged state, the torque converter 22 is switched to a lock-up state in which the pump impeller 22a and the turbine impeller 22b are integrally rotated.

The automatic transmission 24 is a commonly known planetary-gear automatic transmission that includes, for example, one set or a plurality of sets of planetary gear devices (not shown), and a plurality of engaging devices CB. The engaging devices CB are hydraulic friction engaging devices that are each formed by, for example, a multi-disc or single-disc clutch or brake that is pressed by a hydraulic actuator, or a band brake that is tightened by a hydraulic actuator. The control state of each engaging device CB including an engaged state and a released state is switched as CB torque Tcb that is the torque capacity of the engaging device CB is changed by a CB oil pressure PRcb that is regulated and supplied from the oil pressure control circuit 56.

The automatic transmission 24 is a stepped transmission in which one of a plurality of shift stages (also called gear stages) each having a different gear ratio γat (=AT input rotation speed Ni/AT output rotation speed No) is established as one of the engaging devices CB is engaged. In the automatic transmission 24, the gear stage to be established is switched, i.e., one of the gear stages is selectively established, by the electronic control device 90 to be described later according to operation of the accelerator by the driver, a vehicle speed V, etc. The AT input rotation speed Ni is the rotation speed of the transmission input shaft 38 and the input rotation speed of the automatic transmission 24. The AT input rotation speed Ni is also the rotation speed of the output rotating member of the torque converter 22, and has the same value as the turbine rotation speed Nt that is the output rotation speed of the torque converter 22. The AT input rotation speed Ni can be represented by the turbine rotation speed Nt. The AT output rotation speed No is the rotation speed of the transmission output shaft 26 and the output rotation speed of the automatic transmission 24.

The K0 clutch 20 is a wet or dry friction engaging device that is formed by, for example, a multi-disc or single-disc clutch pressed by an actuator. The control state of the K0 clutch 20 including an engaged state and a released state is switched as K0 torque Tk0 that is the torque capacity of the K0 clutch 20 is changed by a K0 oil pressure PRk0 that is regulated and supplied from the oil pressure control circuit 56. An input-side member of the K0 clutch 20 is coupled to the engine coupling shaft 34 and rotated integrally with the engine coupling shaft 34. An output-side member of the K0 clutch 20 is coupled to the MG coupling shaft 36 and rotated integrally with the MG coupling shaft 36.

When the K0 clutch 20 is in the engaged state, the pump impeller 22a and the engine 12 are integrally rotated through the engine coupling shaft 34. Thus, by being engaged, the K0 clutch 20 couples the engine 12 and the driving wheels 14 together such that power can be transmitted therebetween. On the other hand, when the K0 clutch 20 is in the released state, power transmission between the engine 12 and the pump impeller 22a is interrupted. Thus, by being released, the K0 clutch 20 uncouples the engine 12 and the driving wheels 14 from each other. Since the motor-generator MG is coupled to the pump impeller 22a, the K0 clutch 20 functions as a clutch that is provided on the power transmission path between the engine 12 and the motor-generator MG and opens and closes the power transmission path, i.e., as a clutch that connects and disconnects the engine 12 to and from the motor-generator MG. Thus, the K0 clutch 20 is a connecting-disconnecting clutch that is engaged to couple the engine 12 and the motor-generator MG together and released to uncouple the engine 12 and the motor-generator MG from each other.

In the power transmission device 16, when the K0 clutch 20 is engaged, power output from the engine 12 is transmitted from the engine coupling shaft 34 to the driving wheels 14 sequentially through the K0 clutch 20, the MG coupling shaft 36, the torque converter 22, the automatic transmission 24, the propeller shaft 28, the differential gear 30, the driveshafts 32, etc. Regardless of the control state of the K0 clutch 20, power output from the motor-generator MG is transmitted from the MG coupling shaft 36 to the driving wheels 14 sequentially through the torque converter 22, the automatic transmission 24, the propeller shaft 28, the differential gear 30, the driveshafts 32, etc.

The vehicle 10 includes an MOP 58 that is a mechanical oil pump, an EOP 60 that is an electrically operated oil pump, and a pump motor 62. The MOP 58 is coupled to the pump impeller 22a and driven to rotate by the driving power sources (the engine 12 and the motor-generator MG) to discharge hydraulic oil OIL that is used in the power transmission device 16. The pump motor 62 is a motor that is dedicated to the EOP 60 and drives the EOP 60 to rotate. The EOP 60 is driven to rotate by the pump motor 62 to discharge hydraulic oil OIL. The hydraulic oil OIL discharged by the MOP 58 and the EOP 60 is supplied to the oil pressure control circuit 56. The oil pressure control circuit 56 supplies the CB oil pressure PRcb, the K0 oil pressure PRk0, the LU oil pressure PRlu, etc. that are each regulated based on the hydraulic oil OIL discharged by the MOP 58 and/or the EOP 60.

The vehicle 10 further includes the electronic control device 90. The electronic control device 90 is configured to include a so-called microcomputer that includes, for example, a CPU, a RAM, a ROM, and an input-output interface. The CPU executes various modes of control in the vehicle 10 by performing signal processing in accordance with programs that are stored in the ROM in advance by using a temporary storage function of the RAM. As necessary, the electronic control device 90 is configured to include computers for the respective purposes of engine control, MG control, oil pressure control, etc. The electronic control device 90 is a control device that performs the backlash elimination control.

The electronic control device 90 is supplied with various signals etc. (e.g., an engine rotation speed Ne that is the rotation speed of the engine 12; the turbine rotation speed Nt that has the same value as the AT input rotation speed Ni; the AT output rotation speed No corresponding to the vehicle speed V; an MG rotation speed Nm that is the rotation speed of the motor-generator MG; an accelerator operation amount θacc that is an amount of operation of the accelerator (e.g., the amount of pressing of the accelerator pedal) representing the degree of the driver's acceleration request; a throttle valve opening degree θth that is the opening degree of an electronic throttle valve; an intake air amount Qair of the engine 12; a brake ON signal Bon that is a signal indicating a state where a brake pedal for activating a wheel brake is being operated by the driver; a battery temperature THbat, a battery charge-discharge current Ibat, and a battery voltage Vbat of the battery 54; and a hydraulic oil temperature THoil that is the temperature of the hydraulic oil OIL inside the oil pressure control circuit 56) based on detection values of various sensors provided in the vehicle 10 (e.g., an engine rotation speed sensor 70, a turbine rotation speed sensor 72, an output rotation speed sensor 74, an MG rotation speed sensor 76, an accelerator operation amount sensor 78, a throttle valve opening degree sensor 80, an air flowmeter 82, a brake switch 84, a battery sensor 86, and an oil temperature sensor 88). The MG rotation speed Nm corresponds to the input rotation speed of the torque converter 22 that is a fluid transmission device, and the turbine rotation speed Nt corresponds to the output rotation speed of the torque converter 22 that is a fluid transmission device. The accelerator operation amount θacc corresponds to the amount of acceleration request by the driver.

The electronic control device 90 outputs various command signals (e.g., an engine control command signal Se for controlling the engine 12; an MG control command signal Sm for controlling the motor-generator MG; a CB oil pressure control command signal Scb for controlling the engaging devices CB; a K0 oil pressure control command signal Sk0 for controlling the K0 clutch 20; an LU oil pressure control command signal Slu for controlling the LU clutch 40; and an EOP control command signal Seop for controlling the EOP 60) to devices provided in the vehicle 10 (e.g., the engine control device 50, the inverter 52, the oil pressure control circuit 56, and the pump motor 62).

To realize various modes of control in the vehicle 10, the electronic control device 90 includes hybrid control means, i.e., a hybrid control unit 92, gear shift control means, i.e., a gear shift control unit 94, and backlash-elimination control means, i.e., a backlash-elimination control unit 96.

The hybrid control unit 92 has a function as engine control means for controlling the operation of the engine 12, i.e., an engine control part 92a, and a function as MG control means for controlling the operation of the motor-generator MG through the inverter 52, i.e., an MG control part 92b, and by these control functions, executes hybrid driving control by the engine 12 and the motor-generator MG etc.

The hybrid control unit 92 calculates the amount of driving of the vehicle 10 requested by the driver by, for example, applying the accelerator operation amount θacc and the vehicle speed V to a required-amount-of-driving map. The required-amount-of-driving map is a relation that is obtained by experiment or design and stored in advance, i.e., a predetermined relation. The required amount of driving is, for example, required driving torque Trdem for the driving wheels 14. From another perspective, the required driving torque Trdem [Nm] is required driving power Prdem [W] at the vehicle speed V at that time. As the required amount of driving, required driving power Prdem [N] for the driving wheels 14, required AT output torque for the transmission output shaft 26, etc. can also be used. Instead of the vehicle speed V, the AT output rotation speed No or the like may be used to calculate the required amount of driving.

The hybrid control unit 92 obtains required input torque Tindem that is input torque of the torque converter 22 required to achieve the required driving power Prdem, by taking into account transmission loss, an auxiliary load, the gear ratio γat of the automatic transmission 24, the torque ratio of the torque converter 22, chargeable electricity Win and dischargeable electricity Wout of the battery 54, etc. Then, to produce the required input torque Tindem, the hybrid control unit 92 outputs the engine control command signal Se for controlling the engine 12 and the MG control command signal Sm for controlling the motor-generator MG. The engine control command signal Se is, for example, a command value of engine power Pe that is power of the engine 12 for outputting the engine torque Te at the engine rotation speed Ne at that time. The MG control command signal Sm is, for example, a command value of power consumption Wm of the motor-generator MG for outputting the MG torque Tm at the MG rotation speed Nm at that time.

The chargeable electricity Win of the battery 54 is maximum electricity that can be input and that specifies a limit on electricity input into the battery 54, and represents an input limit for the battery 54. The dischargeable electricity Wout of the battery 54 is maximum electricity that can be output and that specifies a limit on electricity output from the battery 54, and represents an output limit for the battery 54. The chargeable electricity Win and the dischargeable electricity Wout of the battery 54 are calculated by the electronic control device 90 based on, for example, the battery temperature THbat and a state-of-charge SOC [%] of the battery 54. The state-of-charge SOC of the battery 54 is a value representing the charge state of the battery 54 and is calculated by the electronic control device 90 based on, for example, the battery charge-discharge current that and the battery voltage Vbat.

When the required input torque Tindem can be covered by the output of the motor-generator MG alone, the hybrid control unit 92 sets the travel mode to motor travel (EV travel) mode. In the EV travel mode, the hybrid control unit 92 performs EV travel in which the vehicle travels using only the motor-generator MG as a driving power source, with the K0 clutch 20 released. On the other hand, when the required input torque Tindem cannot be covered without using at least the output of the engine 12, the hybrid control unit 92 sets the travel mode to engine travel mode, i.e., hybrid travel (HV travel) mode. In the HV travel mode, the hybrid control unit 92 performs engine travel, i.e., HV travel in which the vehicle travels using at least the engine 12 as a driving power source, with the K0 clutch 20 engaged. Also when the required input torque Tindem can be covered by the output of the motor-generator MG alone, the hybrid control unit 92 sets the HV travel mode in cases such as when warming-up of the engine 12 etc. is needed. Thus, the hybrid control unit 92 switches between the EV travel mode and the HV travel mode based on the required input torque Tindem etc. by automatically stopping the engine 12 during HV travel, restarting the engine 12 after thus stopping the engine, starting the engine 12 during EV travel, automatically stopping the engine 12 while the vehicle is stationary, or starting the engine 12.

The engine control part 92a controls the engine torque Te so as to achieve the amount of driving required for the vehicle 10. The MG control part 92b controls the MG torque Tm so as to achieve the amount of driving required for the vehicle 10. Specifically, in the HV travel mode, the engine control part 92a controls the engine torque Te so as to achieve part or the whole of the required input torque Tindem corresponding to the required driving torque Trdem that is system torque Tsys as a target, and the MG control part 92b controls the MG torque Tm so as to compensate for an amount of torque by which the engine torque Te falls short of the required input torque Tindem. In this case, estimated engine torque Tee that is an estimated value of the engine torque Te is used as the engine torque Te. The estimated engine torque Tee can be calculated by, for example, applying the intake air amount Qair and the engine rotation speed Ne to a commonly known engine torque map that is a predetermined relation. In the EV travel mode, the MG control part 92b controls the MG torque Tm so as to achieve the required input torque Tindem. The required driving torque Trdem when the vehicle is stationary is, for example, torque for maintaining creep torque, or torque for maintaining an idling rotation speed Neidl of the engine 12. Creep torque is torque that allows the vehicle 10 to travel by so-called creep travel, for example, while acceleration is off with the accelerator operation amount θacc being zero.

The gear shift control unit 94 determines on a gear shift of the automatic transmission 24, for example, using a gear shift map that is a predetermined relation, and as necessary outputs the CB oil pressure control command signal Scb for executing gear shift control of the automatic transmission 24 to the oil pressure control circuit 56. The gear shift map is a predetermined relation represented by, for example, gear shift lines used for determining a gear shift of the automatic transmission 24 that are plotted in a two-dimensional coordinate plane having the vehicle speed V and the required driving torque Trdem as variables. In the gear shift map, the AT output rotation speed No or the like may be used instead of the vehicle speed V, and the required driving power Frdem, the accelerator operation amount θacc, the throttle valve opening degree θth, or the like may be used instead of the required driving torque Trdem.

Figure 2:
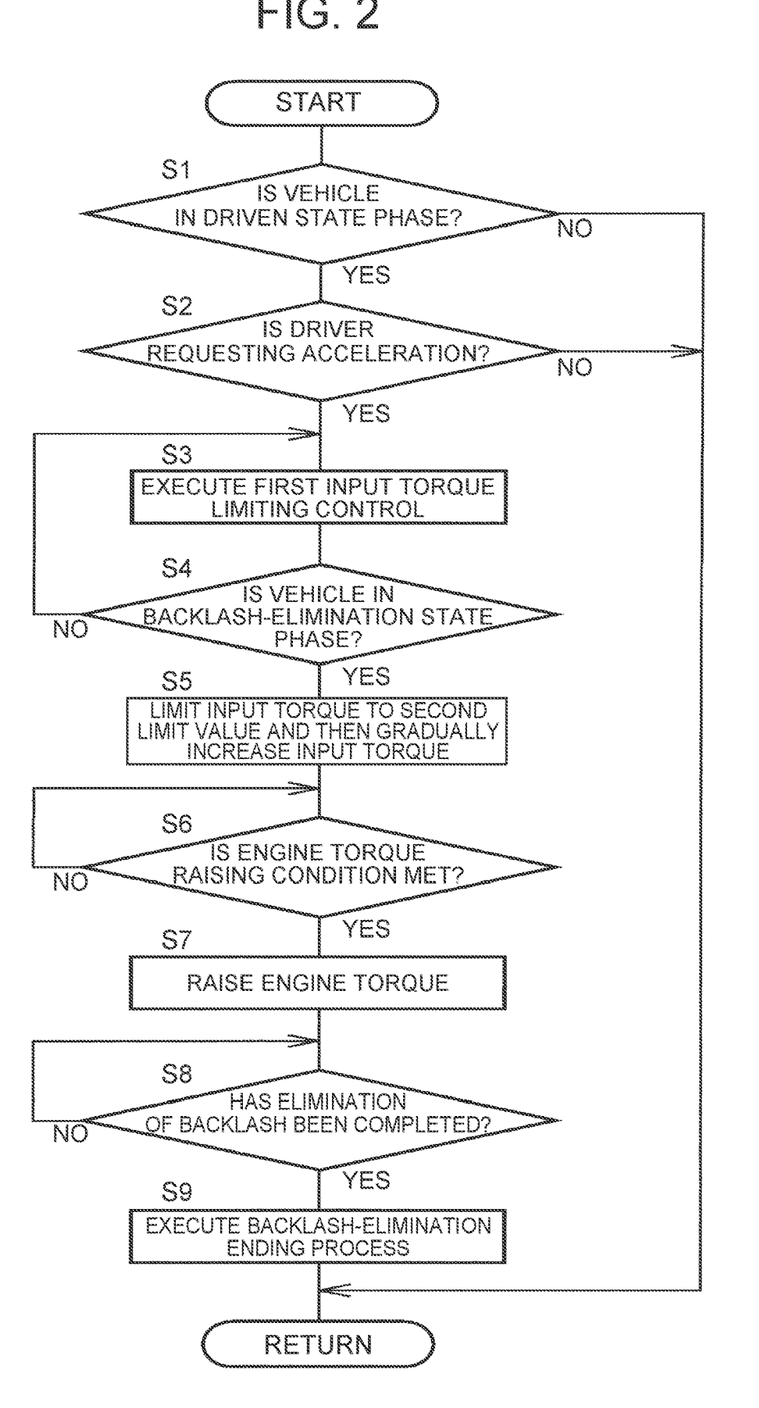
FIG. 2 is a flowchart specifically illustrating the operation of a backlash-elimination control unit that is functionally included in an electronic control device of the vehicle of FIG. 1.

When the vehicle transitions from driven travel in which power is transmitted from the side of the transmission input shaft 38 toward the side of the MG coupling shaft 36 through the torque converter 22, with the LU clutch 40 in the fully released state, to driving travel in which power is transmitted from the side of the MG coupling shaft 36 toward the side of the transmission input shaft 38 through the torque converter 22, the backlash-elimination control unit 96 executes the backlash elimination control of smoothly eliminating the backlash in parts of the automatic transmission 24 and the differential gear 30 to thereby mitigate the rattling shock due to the backlash in the automatic transmission 24 and the differential gear 30. The backlash-elimination control unit 96 functionally includes a first input limiting part 96a, a second input limiting part 96b, and a backlash-elimination ending processing part 96c, and executes signal processing in accordance with steps S1 to S9 (hereinafter simply written as "S1 to S9" with "step" omitted) of the flowchart of FIG. 2. In the flowchart of FIG. 2, S1 to S3 correspond to the first input limiting part 96a, S4 to S7 correspond to the second input limiting part 96b, and S8 to S9 correspond to the backlash-elimination ending processing part 96c.

Figure 3:
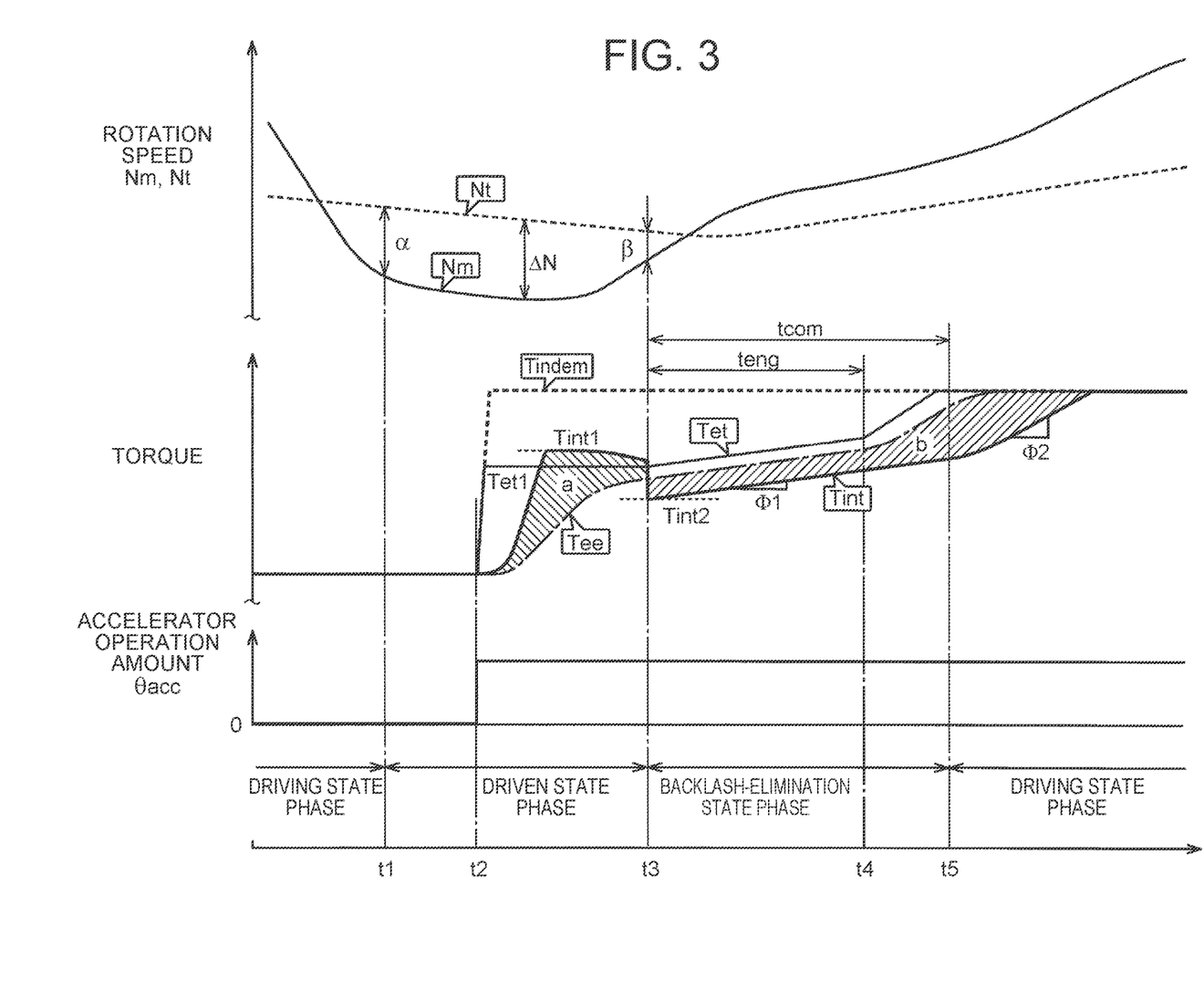
FIG. 3 is one example of a time chart illustrating changes in the operating states of parts when backlash elimination control is performed in accordance with the flowchart of FIG. 2 during tip-in acceleration.

In S1 of the flowchart of FIG. 2, it is determined whether the vehicle is in a predetermined driven state phase. Specifically, it is determined that the vehicle is in the driven state phase when a rotational difference ΔN (=Nm−Nt) obtained by subtracting the turbine rotation speed Nt that is the output rotation speed of the torque converter 22 from the MG rotation speed Nm that is the input rotation speed of the torque converter 22 is negative and, moreover, an absolute value ΔNab of the rotational difference ΔN is equal to or larger than a predetermined driven-state criterial value α. The driven-state criterial value α is set to, for example, a fixed value in advance. When the vehicle is not in the driven state phase, the current process ends directly, and when the vehicle is in the driven state phase, S2 is executed. FIG. 3 is one example of a time chart showing changes in the rotation speeds Nm and Nt, the torques Tindem, Tint, Tet, and Tee, and the accelerator operation amount θacc when the backlash elimination control is performed in accordance with the flowchart of FIG. 2 during travel in the HV travel mode. Time t1 is time at which it is determined that the vehicle is in the driven state phase. This means that at time t1, the vehicle is coasting or in decelerated travel with the accelerator operation amount θacc=0 and acceleration off and with the engine 12 in an idling state (with idling on). Time t1 is time at which engine braking starts to work as the engine rotation speed Ne (=MG rotation speed Nm) decreases. In the torque section of FIG. 3, Tindem indicated by the broken line is required input torque; Tint indicated by the thick solid line is target input torque; Tet indicated by the thin solid line is target engine torque; Tee indicated by long dashed short dashed line is estimated engine torque; the shaded part a represents motoring torque of the motor-generator MG; and the shaded part b represents regenerative torque of the motor-generator MG.

In S2, it is determined whether the driver has performed an acceleration requesting operation, i.e., whether acceleration is on with the accelerator pedal operated by being pressed. Specifically, this determination is made based on the accelerator operation amount θacc, and when acceleration is off with the accelerator operation amount θacc=0, the current process ends directly, and when acceleration is on, S3 and the subsequent steps are executed. The backlash-elimination control unit 96 of this embodiment performs the backlash elimination control of the automatic transmission 24 and the differential gear 30 during so-called tip-in acceleration that is transition of the vehicle from driven travel with acceleration off to driving travel in response to the driver's acceleration request.

Figure 4:
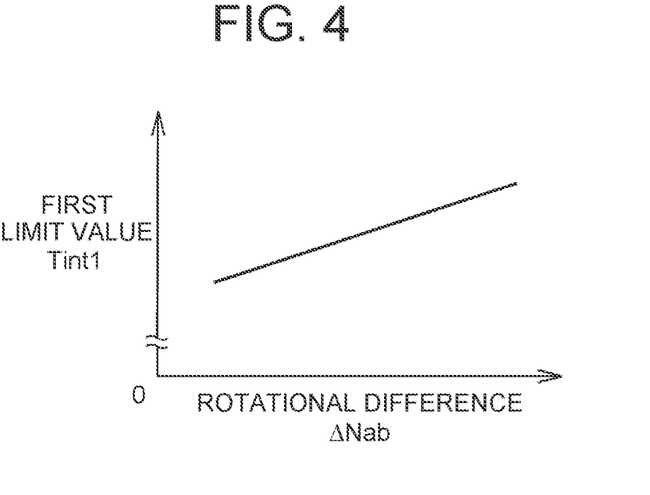
FIG. 4 is a graph illustrating one example of a predetermined map for setting a first limit value Tint1 according to an absolute value ΔNab of a rotational difference in step S3 of FIG. 2.

In S3, first input torque limiting control of limiting the input torque Tin of the torque converter 22 so as not to exceed a predetermined first limit value Tint1, regardless of the driver's acceleration request, is executed. Specifically, the target input torque Tint is limited so as not to exceed the first limit value Tint1, and the torque of the engine 12 and the torque of the motor-generator MG are controlled according to the target input torque Tint. The first limit value Tint1 is provided to quickly eliminate the rotational difference ΔN and thereby secure the responsiveness of driving power while mitigating the rattling shock, and may be set to a fixed value in advance. In this embodiment, however, using the absolute value ΔNab of the rotational difference ΔN as a parameter, the first limit value Tint1 is set so as to become gradually lower as the absolute value ΔNab becomes smaller, as shown in FIG. 4. S3 is repeatedly executed until the determination result of S4 becomes "Yes" (affirmative), and the target input torque Tint is sequentially changed according to changes in the first limit value Tint1 that changes as the absolute value ΔNab of the rotational difference ΔN changes. Thus, when the absolute value ΔNab of the rotational difference ΔN is large, the first limit value Tint1 is set to a high value to quickly increase the MG rotation speed Nm. When the absolute value ΔNab of the rotational difference ΔN is small, the first limit value Tint1 is set to a low value to slow down the increase in the MG rotation speed Nm and thereby mitigate the rattling shock. The first limit value Tint1 is set within a range of, for example, about 100 Nm to 150 Nm.

Time t2 in FIG. 3 is time at which the determination result of S2 becomes "Yes" in response to the driver's acceleration request and the first input torque limiting control of S3 is started. Even when the required input torque Tindem obtained according to the accelerator operation amount θacc, the vehicle speed V, etc. becomes higher than the first limit value Tint1, the target input torque Tint is limited to the first limit value Tint1, and the torque of the engine 12 and the torque of the motor-generator MG are controlled according to the target input torque Tint. In this case, it is also possible to achieve the target input torque Tint, for example, by using the torque Tm of the motor-generator MG while keeping the engine 12 in an idling state. In this embodiment, however, a predetermined engine torque set value Tet1 that is lower than the first limit value Tint1 is set as target engine torque Tet, and the engine 12 is operated at the target engine torque Tet (=Tet1). Further, the estimated engine torque Tee of the engine 12 is calculated, and the motor-generator MG is controlled such that a shortage (the area of the shaded part a) relative to the target input torque Tint (=Tins1) is compensated for by the MG torque Tm. As the target input torque Tint is thus achieved by torque control of the motor-generator MG, the target input torque Tint substantially corresponds to the actual input torque Tin. The engine torque set value Tet1 is set within a range of, for example, about 80 Nm to 100 Nm. Specific control of the engine 12 and the motor-generator MG is executed through the hybrid control unit 92. The backlash-elimination control unit 96 may be included in the hybrid control unit 92.

In S4, it is determined whether the vehicle is in a predetermined backlash-elimination state phase. Specifically, it is determined that the vehicle is in the backlash-elimination state phase when the absolute value ΔNab of the rotational difference ΔN becomes equal to or smaller than a predetermined backlash-elimination criterial value β. The backlash-elimination criterial value β is set to a fixed value in advance, for example, but may be set so as to vary according to the change rate of the rotational difference ΔN, the change rate of the MG rotation speed Nm, etc. For example, the backlash-elimination criterial value β may be set to a large value when the change rate of the absolute value ΔNab of the rotational difference ΔN in the decreasing direction is high. When the vehicle is not in the backlash-elimination state phase, S3 is repeatedly executed. When the vehicle enters the backlash-elimination state phase, S5 is executed.

In S5, second input torque limiting control of limiting the input torque Tin of the torque converter 22 so as not to exceed a predetermined second limit value Tint2, regardless of the driver's acceleration request, and gradually increasing the input torque Tin at a predetermined change rate Φ1 is executed. Specifically, the target input torque Tint is reduced to the second limit value Tint2 and then gradually increased at the predetermined change rate Φ1, and the torque of the engine 12 and the torque of the motor-generator MG are controlled according to the target input torque Tint. The second limit value Tint2 is set to, for example, torque of about 10 Nm or less to mitigate the rattling shock. The change rate Φ1 is set to a fixed value in advance, for example, such that the backlash in the automatic transmission 24 and the differential gear 30 is reliably eliminated in the process of gradually increasing the input torque Tin, regardless of individual differences among parts, but can also be varied in the process of control based on the change rate of the rotational difference ΔN etc. As the input torque Tin is thus gradually increased at the predetermined change rate Φ1, the backlash in the automatic transmission 24 and the differential gear 30 can be smoothly eliminated using minimum input torque Tin required to eliminate the backlash. Moreover, the backlash in the automatic transmission 24 and the differential gear 30 is reliably eliminated in the process of gradually increasing the input torque Tin, regardless of individual differences among parts, including rotational resistance.

Time t3 in FIG. 3 is time at which the absolute value ΔNab of the rotational difference ΔN becomes equal to or smaller than the backlash-elimination criterial value β and the determination result of S4 becomes "Yes," and the second input torque limiting control of S5 is started. After the initial value of the target input torque Tint is reduced to the second limit value Tint2, the target input torque Tint is gradually increased at the fixed change rate Φ1, and the torque of the engine 12 and the torque of the motor-generator MG is controlled according to the target input torque Tint. In this case, it is also possible to gradually increase the target input torque Tint at the change rate Φ1, for example, by using the torque Tm of the motor-generator MG while maintaining the target engine torque Tet at the engine torque set value Tet1. In this embodiment, however, the target engine torque Tet is also gradually increased at the same change rate Φ1 as the target input torque Tint. The second limit value Tint2 is sufficiently lower than the engine torque set value Tet1 and lower than the estimated engine torque Tee. Therefore, the MG torque (here, regenerative torque) Tm is controlled such that an excess (the area of the shaded part b) relative to the second limit value Tint2 is offset by regeneration control of the motor-generator MG. In other words, the engine torque set value Tet1 is set to a value higher than the second limit value Tint2 such that the second limit value Tint2 can be achieved by regeneration control of the motor-generator MG.

In S6, it is determined whether an engine torque raising condition is met. The engine torque raising condition is provided to raise the engine torque Te already before the end of the backlash elimination control such that the required input torque Tindem can be quickly obtained based on the engine torque Te after the end of the backlash elimination control. The engine torque raising condition is determined based on, for example, the time that has elapsed since the starting point of the backlash-elimination state phase (time t3). Specifically, it is determined whether the elapsed time of the backlash-elimination state phase has reached a predetermined engine torque raising criterial time teng, and when the elapsed time has reached the engine torque raising criterial time teng, engine torque raising control of S7 is executed. The engine torque raising criterial time teng is set to, for example, a fixed value for each gear stage of the automatic transmission 24, but may be set to a fixed value regardless of the gear stage. Time t4 in FIG. 3 is time at which the elapsed time of the backlash-elimination state phase has reached the engine torque raising criterial time teng and the determination result of S6 becomes "Yes," and the engine torque raising control of S7 is started.

The engine torque raising control of S7 involves raising the target engine torque Tet at a relatively high change rate until meeting the required input torque Tindem, and controlling the torque Tm of the motor-generator MG such that the gradually increasing state of the input torque Tin is maintained regardless of the target engine torque Tet being raised. Specifically, the target engine torque Tet is raised at a predetermined change rate higher than the change rate Φ1 and the estimated engine torque Tee is calculated. The MG torque (here, regenerative torque) Tm is controlled such that an excess (the area of the shaded part b) relative to the target input torque Tint that is gradually increased at the change rate Φ1 is offset by regeneration control of the motor-generator MG. Thus, the required input torque Tindem can be quickly generated based on the engine torque Te after completion of elimination of the backlash, which enhances the responsiveness of driving power. Meanwhile, since the input torque Tin is gradually increased at the change rate Φ1 also during the raise of the engine torque Te, the backlash in the automatic transmission 24 and the differential gear 30 can be smoothly eliminated using minimum input torque Tin required to eliminate the backlash.

In S8, it is determined whether elimination of the backlash in the automatic transmission 24 and the differential gear 30 has been completed. Specifically, it is determined whether the time that has elapsed since the starting point of the backlash-elimination state phase (time t3) has reached a predetermined backlash-elimination completion criterial time tcom, and when the elapsed time has reached the backlash-elimination completion criterial time tcom, it is determined that elimination of the backlash has been completed, and backlash-elimination ending process of S9 is executed. The backlash-elimination completion criterial time tcom is set to, for example, a fixed value for each gear stage of the automatic transmission 24, but may be set to a fixed value regardless of the gear stage. Time t5 in FIG. 3 is time at which the elapsed time of the backlash-elimination state phase has reached the backlash-elimination completion criterial time tcom and the determination result of S8 becomes "Yes," and the backlash-elimination ending process of S9 is started. Time t5 is also a starting point of a driving state phase in which power is transmitted from the MG coupling shaft 36 on the input side to the transmission input shaft 38 on the output side through the torque converter 22.

The backlash-elimination ending process of S9 involves increasing the target input torque Tint to the required input torque Tindem at a predetermined change rate $\Phi 2$ higher than the change rate $\Phi 1$, and gradually reducing the torque (here, regenerative torque; the shaded part b of FIG. 3) Tm of the motor-generator MG so as to achieve the target input torque Tint. Thus, the target input torque Tint is made to meet the required input torque Tindem, and driving torque Tr and driving power Fr as requested by the driver are obtained. In this case, the change rate $\Phi 2$ of the target input torque Tint is higher than the change rate $\Phi 1$, so that the vehicle 10 is allowed to quickly transition to driving travel at the required driving torque Trdem. Meanwhile, the target input torque Tint is smoothly increased according to the change rate $\Phi 2$, which makes it less likely that the driving power Fr may change rapidly due to a rapid change in the input torque Tin and cause discomfort to the driver.

As has been described above, in the driven state phase in which the rotational difference $\Delta N$ is negative, the electronic control device 90 of the vehicle 10 of the embodiment limits the target input torque Tint to the first limit value Tint1 by the first input limiting part 96a, whereas in the backlash-elimination state phase in which the rotational difference $\Delta N$ changes from negative to positive, the electronic control device 90 limits the target input torque Tint to the second limit value Tint2 that is lower than the first limit value Tint1 by the second input limiting part 96b, and controls the target engine torque Tet and the torque Tm of the motor-generator MG (the shaded parts a and b) according to the target input torque Tint. Thus, in the backlash-elimination state phase, the target input torque Tint is limited to the sufficiently low second limit value Tint2 that is suitable for mitigating the rattling shock, so that the rattling shock can be appropriately mitigated. Meanwhile, in the driven state phase, the target input torque Tint is limited to the relatively high first limit value Tint1, so that the MG rotation speed Nm can be quickly increased to eliminate the rotational difference $\Delta N$, which enhances the responsiveness of driving power up to when the required driving power Frdem is obtained after the backlash-elimination state phase. In particular, these modes of control for achieving the target input torque Tint are performed using the motor-generator MG. It is therefore possible to control the input torque Tin with high accuracy and to mitigate the rattling shock while securing the responsiveness of driving power.

The initial value of the target input torque Tint in the backlash-elimination state phase is limited to the second limit value Tint2 and then the target input torque Tint is gradually increased at the change rate $\Phi 1$. Thus, the backlash in the automatic transmission 24 and the differential gear 30 can be smoothly eliminated using minimum input torque Tin required to eliminate the backlash. Moreover, the backlash in the automatic transmission 24 and the differential gear 30 is reliably eliminated in the process of gradually increasing the input torque Tin, regardless of individual differences among parts, including rotational resistance.

As shown in FIG. 4, the first limit value Tint1 is set according to the rotational difference $\Delta N$ so as to become relatively high when the absolute value $\Delta Nab$ of the rotational difference $\Delta N$ is large than when the absolute value $\Delta Nab$ is small, which makes it possible to appropriately mitigate the rattling shock while securing the responsiveness of driving power. That is, when the absolute value $\Delta Nab$ of the rotational difference $\Delta N$ is large and the target input torque Tint (=Tins1) is low, it takes a long time to eliminate the rotational difference $\Delta N$ due to the low speed with which the MG rotation speed Nm increases, so that the responsiveness of driving power is reduced. Conversely, when the absolute value $\Delta Nab$ of the rotational difference $\Delta N$ is small and the target input torque Tint (=Tins1) is high, the speed with which the MG rotation speed Nm increases may become so high that significant rattling shock occurs in the next backlash-elimination state phase.

As clearly seen from FIG. 4, the first limit value Tint1 is set so as to become gradually lower as the absolute value $\Delta Nab$ of the rotational difference $\Delta N$ becomes smaller, and when executing the first input torque limiting control in the driven state phase, the first input limiting part 96a changes the target input torque Tint according to changes in the first limit value Tint1 that changes as the absolute value $\Delta Nab$ of the rotational difference $\Delta N$ changes. Thus, the target input torque Tint is appropriately controlled according to changes in the rotational difference $\Delta N$, so that the rattling shock can be mitigated while the responsiveness of driving power is secured.

The motor-generator MG is used as the electric motor, and the vehicle 10 includes the engine 12 other than the motor-generator MG as a driving power source. The first input limiting part 96a operates the engine 12 at the target engine torque Tet (=Tet1) that is lower than the first limit value Tint1 and higher than the second limit value Tint2, and compensates for a shortage (=Tint−Tee) relative to the target input torque Tint that is the first limit value Tint1 using the motor-generator MG. The second input limiting part 96b operates the engine 12 at the target engine torque Tet that is higher than the second limit value Tint2, and offsets an excess relative to the target input torque Tint that is the second limit value Tint2 by regeneration control of the motor-generator MG. Thus, also when the torque capacity of the motor-generator MG is relatively small, the input torque Tin can be controlled with high accuracy by torque control of the motor-generator MG. That is, not only when the torque-capacity of the motor-generator MG itself is small, but also when the torque Tm of the motor-generator MG is limited due to factors including limitations on the input and output (limitations on the charge and discharge) of the battery 54, the input torque Tin can be controlled with high accuracy using the motor-generator MG.

In the backlash-elimination state phase, the target engine torque Tet and the target input torque Tint are each gradually increased at the change rate $\Phi 1$, and in that process the target engine torque Tet is raised until meeting the required input torque Tindem, while the engine 12 and the motor-generator MG are controlled such that the gradually increasing state of the target input torque Tint is maintained regardless of the target engine torque Tet being raised. Thus, the backlash in the automatic transmission 24 and the differential gear 30 can be smoothly eliminated using the minimum input torque Tin required to eliminate the backlash, and moreover, the backlash in the automatic transmission 24 and the differential gear 30 is reliably eliminated in the process of gradually increasing the input torque Tin, regardless of individual differences among parts, including rotational resistance. Further, since the target engine torque Tet is raised until meeting the required input torque Tindem in the process of gradually increasing the input torque Tin, the required input torque Tindem can be quickly generated based on the engine torque Te after completion of elimination of the backlash, which enhances the responsiveness of driving power.

When it is determined that elimination of the backlash has been completed in the backlash-elimination state phase (the determination result of S8 is "Yes"), the vehicle 10 transitions to the driving state phase, in which the target input torque Tint is gradually increased at the predetermined change rate Φ2 until meeting the required input torque Tindem, and the regenerative torque Tm (the shaded part b of FIG. 3) of the motor-generator MG is gradually reduced according to the target input torque Tint. Thus, the input torque Tin is smoothly increased according to the change rate Φ2 after completion of elimination of the backlash, which makes it less likely that the driving power Fr may change rapidly due to a rapid change in the input torque Tin and cause discomfort to the driver.

The backlash-elimination control unit 96 of the embodiment eliminates the backlash in the automatic transmission 24 and the differential gear 30 when the vehicle 10 in driven travel transitions to driving travel as a result of an acceleration requesting operation performed by the driver. As this requires responsiveness of driving power, the advantage of mitigating the rattling shock while securing the responsiveness of driving power is remarkably exhibited.

While the embodiment of the disclosure has been described in detail above based on the drawings, other aspects of the disclosure can also be adopted.

For example, in the above embodiment, the vehicle 10 including the engine 12 and the single motor-generator MG as driving power sources has been described. However, the disclosure is also applicable to a hybrid electric vehicle or the like that includes two or more motor-generators MG.

In the above embodiment, the planetary-gear automatic transmission has been illustrated as the automatic transmission 24 that constitutes part of the power transmission path between the engine 12 and the driving wheels 14 and transmits driving power from each of the driving power sources (the engine 12 and the motor-generator MG) to the driving wheels 14. However, the disclosure is not limited to this aspect. As long as at least a gear mechanism, such as the differential gear 30, is provided on the power transmission path, the automatic transmission 24 may be a commonly known synchromesh parallel two-axis automatic transmission, one example of which is a dual-clutch transmission (DCT), or may be a commonly known belt-driven continuously variable transmission.

What has been described above is merely one embodiment, and the disclosure can be implemented with various changes and improvements made to its aspects based on the knowledge of those skilled in the art.

What is claimed is:

1. A vehicle control device for a vehicle equipped with an electric motor as a driving power source and having a fluid transmission device and a gear mechanism installed on a power transmission path between the driving power source and driving wheels, in series from a side of the driving power source,
the vehicle control device having a backlash-elimination control unit that eliminates backlash in the gear mechanism when the vehicle transitions from driven travel in which power is transmitted from a side of the gear mechanism toward the side of the driving power source through the fluid transmission device to driving travel in which power is transmitted from the side of the driving power source toward the side of the gear mechanism through the fluid transmission device, wherein the backlash-elimination control unit has:
a first input limiting part that, in a predetermined driven state phase in which a rotational difference obtained by subtracting an output rotation speed of the fluid transmission device on the side of the gear mechanism from an input rotation speed of the fluid transmission device on the side of the driving power source is negative, limits input torque that is input into the fluid transmission device from the side of the driving power source to a first limit value by controlling torque of the electric motor; and
a second input limiting part that, in a predetermined backlash-elimination state phase that follows the driven state phase and is set in a region near a point at which the rotational difference changes from negative to positive, limits the input torque to a second limit value lower than the first limit value by controlling the torque of the electric motor.

2. The vehicle control device according to claim 1, wherein the second input limiting part limits an initial value of the input torque in the backlash-elimination state phase to the second limit value and then gradually increases the input torque above the second limit value.

3. The vehicle control device according to claim 1, wherein the first limit value is set according to the rotational difference so as to become higher when an absolute value of the rotational difference is large than when the absolute value is small.

4. The vehicle control device according to claim 3, wherein:
the first limit value is set so as to become gradually lower as the absolute value of the rotational difference becomes smaller; and
when limiting the input torque in the driven state phase, the first input limiting part changes the input torque according to changes in the first limit value that changes as the absolute value of the rotational difference changes.

5. The vehicle control device according to claim 1, wherein:
the electric motor is a motor-generator capable of functioning as a generator under regeneration control, and the vehicle includes an engine other than the motor-generator as a driving power source;
the first input limiting part makes the input torque meet the first limit value by operating the engine at target engine torque that is lower than the first limit value and higher than the second limit value and compensating for a shortage relative to the first limit value using the motor-generator; and
the second input limiting part makes the input torque meet the second limit value by operating the engine at target engine torque that is higher than the second limit value and offsetting an excess relative to the second limit value by regeneration control of the motor-generator.

6. The vehicle control device according to claim 5, wherein the second input limiting part gradually increases each of the target engine torque and the input torque in the backlash-elimination state phase, and in that process raises the target engine torque until meeting required input torque, while controlling the engine and the motor-generator such that a gradually increasing state of the input torque is maintained regardless of the target engine torque being raised.

7. The vehicle control device according to claim 5, wherein the backlash-elimination control unit includes a backlash-elimination ending processing part that, when it is determined that elimination of backlash in the gear mechanism has been completed in the backlash-elimination state phase in which the input torque is limited by the second input limiting part, gradually increases the input torque at a predetermined change rate until meeting required input torque by torque control of the motor-generator.

8. The vehicle control device according to claim 1, wherein the backlash-elimination control unit eliminates backlash in the gear mechanism when the vehicle in the driven travel transitions to the driving travel in response to an acceleration request.

* * * * *